United States Patent [19]

Smith

[11] 3,809,999

[45] May 7, 1974

[54] DIRECT CURRENT VOLTAGE REGULATOR

[75] Inventor: Cantrell Smith, Lynchburg, Va.

[73] Assignee: General Electric Company, Lynchburg, Va.

[22] Filed: Apr. 19, 1973

[21] Appl. No.: 352,481

[52] U.S. Cl............ 323/17, 317/33 VR, 323/22 T, 323/8
[51] Int. Cl.............................................. G05f 1/56
[58] Field of Search............ 323/17, 22 T, 22 SC, 8, 323/DIG. 1; 321/2, 25; 331/113 A; 317/33 VR

[56] References Cited
UNITED STATES PATENTS

| | | |
|---|---|---|
| 3,629,622 | 12/1971 | Denenberg, Jr. ............... 323/DIG. 1 |
| 3,754,182 | 8/1973 | Morris et al. ................... 323/DIG. 1 |
| 3,539,865 | 11/1970 | Billings ............................... 323/8 X |
| 3,626,277 | 12/1971 | Munson ............................... 323/17 |

*Primary Examiner*—Gerald Goldberg

[57] ABSTRACT

Improved regulation of direct current voltage from an unstable voltage source through a transitor series regulator to a load is provided by a lockout circuit that prevents current flow through the series regulator when the source voltage is removed from the lockout circuit, by a current limiter circuit that controls the series regulator as a function of current supplied to a load, and by a current cutoff circuit that prevents current flow through the series regulator when the output voltage falls below a selected magnitude.

3 Claims, 3 Drawing Figures

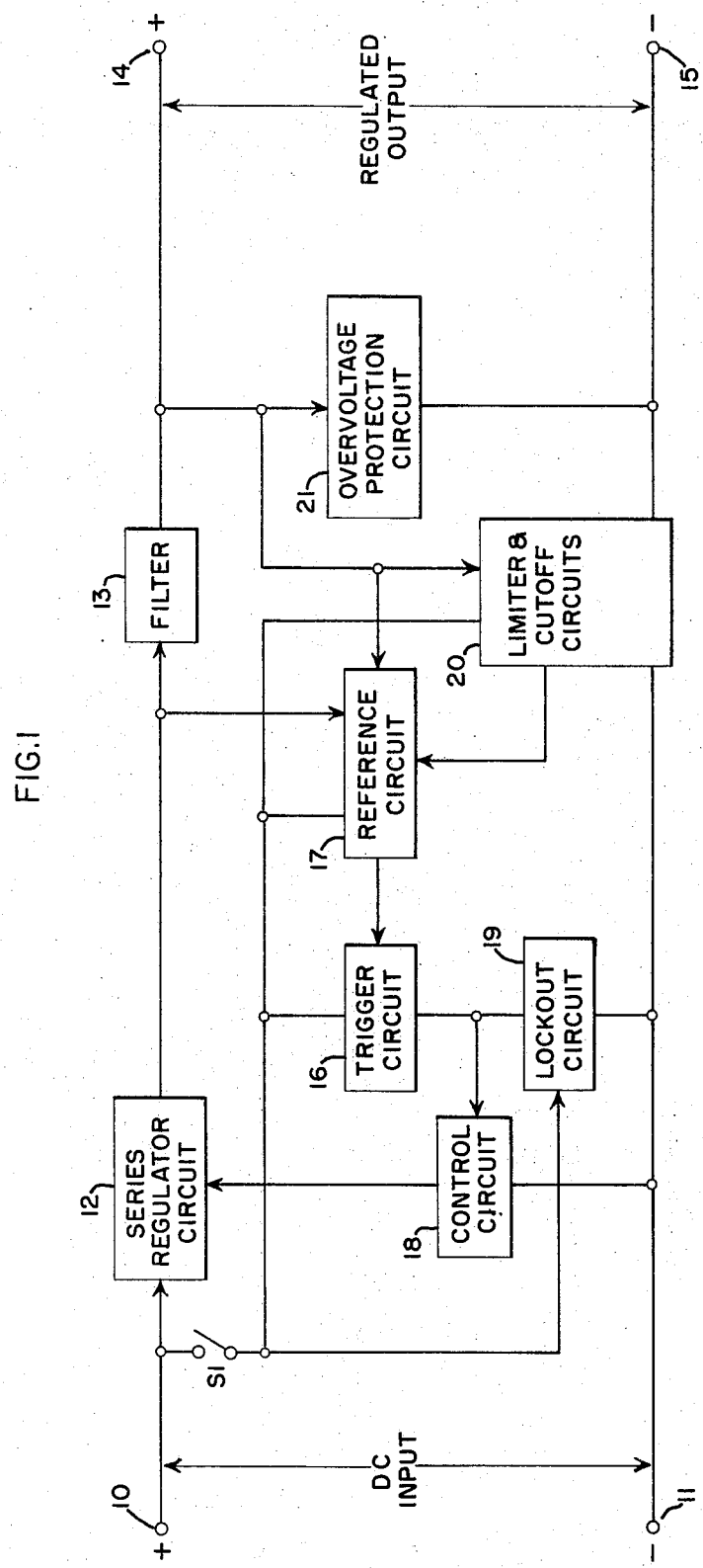

DIRECT CURRENT VOLTAGE REGULATOR

BACKGROUND OF THE INVENTION

My invention relates to a direct current voltage regulator, and particularly to a direct current voltage regulator that provides improved current and voltage control features.

In remote or movable apparatus having electrical equipment, particularly vehicles having electronic or radio equipment, a source of direct current power is frequently provided for the apparatus and for the equipment. This source may take various forms, such as a storage battery that is periodically charged, or that is charged by a direct current generator that is driven at a variable speed, depending on use. In such situations, the voltage of the direct current source varies widely and rapidly. The electronic or the radio equipment needs or requires a well regulated direct current voltage, as this equipment has various components, particularly transistors, which must be supplied with the proper voltage. An excess voltage can destory such equipment very quickly. A deficient voltage may not destroy the equipment, but it does mean that the equipment operates at reduced efficiency or not at all.

Accordingly, an object of my invention is to provide a novel and improved direct current voltage regulator that regulates the voltage supplied by a relatively unstable voltage source so that relatively well regulated voltage can be supplied to a load.

Another object of my invention is to provide an improved direct current voltage regulator that has a lockout circuit to provide positive and sure removal of voltage from the load when the regulator is turned off.

Another object of my invention is to provide an improved direct current voltage regulator that has a current limiter to limit the current supplied to a load to a selected magnitude.

Another object of my invention is to provide an improved direct current voltage regulator that has a cutoff circuit to stop the supply of current to a load when the regulator output voltage falls below a selected magnitude.

Another object of my invention is to provide a novel direct current voltage regulator that has the improvements including the above-mentioned lockout circuit, current limiter, and cutoff circuit.

SUMMARY OF THE INVENTION

Briefly, these and other objects are achieved in a voltage regulator that has input terminals for receiving a source of variable direct current voltage. A series regulator circuit is connected to the input terminals, and a filter is connected from the series regulator circuit to output terminals. A voltage reference circuit is connected to the output terminals for producing a reference circuit signal in response to a voltage at the output terminals that is below a selected reference voltage magnitude. A control circuit is provided with an input connected to the voltage reference circuit and an output for producing a conducting signal in response to the reference circuit signal. The control circuit supplies the conducting signal to the series regulator, and thus controls the series regulator and the voltage supplied to the output terminals as a function of the reference circuit signal. The regulator as described thus far is known in the art and provides a relatively stable direct current voltage. In accordance with my invention, I provide an improved regulator circuit having a lockout circuit connected to the input of the control circuit. The lockout circuit has an input terminal for connection to the source of supplied direct current voltage. The lockout circuit includes means for preventing reference circuit signals from being applied to the series regulator when direct current voltage is removed from the lockout circuit. Also in accordance with my invention, I provide a current limiter circuit having means connected to the voltage regulator for sensing the magnitude of current supplied and for changing the reference voltage in the reference circuit as an inverse function of this current. The current limiter thus changes the reference voltage so as to limit the current supplied by the current regulator. Further in accordance with my invention, I provide a cutoff circuit connected to the voltage reference circuit for preventing reference circuit signals from being supplied in response to the regulator output voltage falling below a selected magnitude. This last feature is desirable when the output voltage falls below a magnitude that is necessary or desirable for proper operation of the load coupled to the regulator. And finally, in accordance with my invention, I provide a shoft-circuiting device coupled across the voltage regulator output for short-circuiting the output when the output voltage exceeds a selected magnitude.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 1 shows a block diagram of a direct current voltage regulator incorporating the improved features of my invention.

DESCRIPTION OF THE PREFERRED EMBODIMENT — GENERAL

Figure 2A:
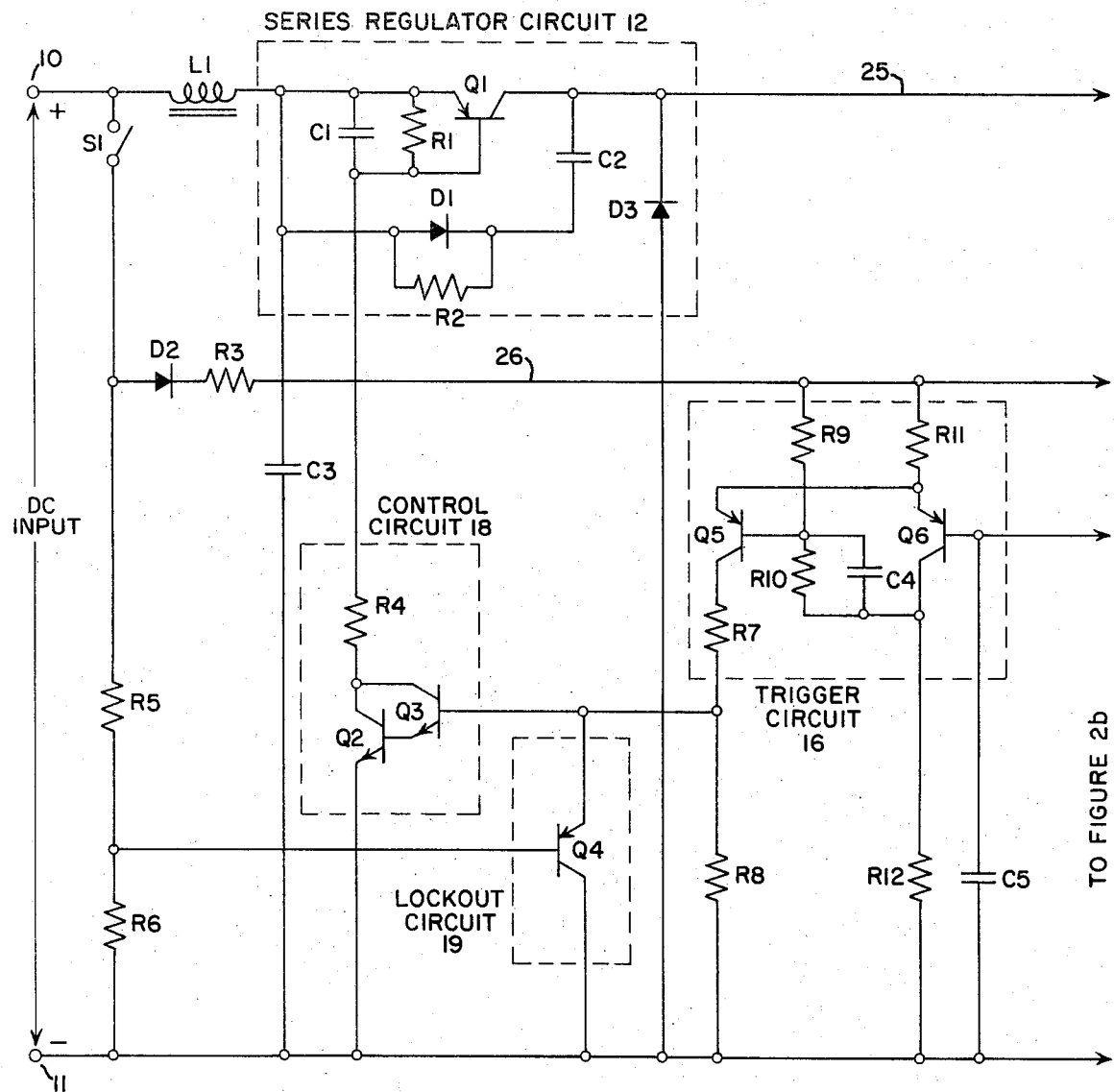
FIGS. 2a and 2b show a complete electrical diagram of the voltage regulator of FIG. 1.

With respect to FIG. 1, a source of relatively unstable or variable direct current voltage is supplied to positive and negative input terminals 10, 11. While the variations of such sources differ, my circuit was designed for variations between 16 and 60 volts. The positive input terminal 10 is connected to a series regulator circuit 12, which is connected through a filter 13 to a positive output terminal 14. A load, not shown is connected between the positive output terminal 14 and a negative output terminal 15. The negative output terminal 15 is connected through a limiter and cutoff circuit 20 to the negative input terminal 11. A switch S1 is connected to the positive input terminal 10 for supplying direct current to a trigger circuit 16, a reference circuit 17, and a limiter and cutoff circuit 20. The reference circuit 17 is supplied with a square wave output voltage from the series regulator circuit 12. The reference circuit 17 compares the average of this voltage with a reference voltage. If the average output voltage falls below a selected magnitude, the reference circuit 17 produces a reference circuit signal in response to this condition. This signal is sharpened by a trigger circuit 16 which is connected to a control circuit 18. The circuit 18 supplies a conducting signal to the series regulator circuit 12 in response to the reference circuit signal. The conducting signal causes the series regulator circuit 12 to supply current to the filter 13 and output terminals 14, 15. If the output voltage of the series regulator circuit 12 exceeds a selected magnitude, the reference circuit 17 produces no reference circuit signal. This causes the control circuit 18 to remove the conducting signal so that the series regulator circuit 12 opens. Thus, the series regulator circuit 12 is caused to switch so that it opens and closes a path from the input terminal 10 to the filter 13. The filter 13 comprises inductors and capacitors which provide energy storage so that a relatively smooth or well regulated current is supplied to the output terminal 14. The circuit described thus far was known in the art prior to my invention.

In accordance with my invention, I provide a lockout circuit 19 which is connected to the input of the control circuit 18. The lockout circuit 19 permits the control circuit 18 to function when the switch S1 is closed, but insures that the control circuit 18 does not provide a conducting signal when the switch S1 is open. I also provide the current limiter and cutoff circuit 20 which is connected to the reference circuit 17. The current limiter and cutoff circuit 20 is connected between the output terminal 15 and the input terminal 11 so as to sense the current supplied to the load. If this current exceeds a selected magnitude, the current limiter portion of the circuit 20 changes the reference voltage of the reference circuit 17 to cause the series regulator circuit 12 to supply current for shorter periods of time during switching. If the current supplied to the load falls below a selected magnitude, the current limiter portion of the circuit 20 stops functioning, and the output voltage is controlled by the reference circuit 17. The cutoff portion of the circuit 20 has a voltage sensing device which senses the voltage at the output of the filter 13. If this voltage falls below a selected magnitude, the cutoff portion of the circuit 20 causes the series regulator circuit 12 to open and supply no more current. This is because such a relatively low voltage does not operate the load equipment in a proper manner, and a low voltage is no more desirable, and may be less desirable, than no voltage at all. And finally, I provide an overvoltage protection circuit 21 connected to the output terminals 14, 15. If the voltage at these terminals 14, 15 exceeds a selected magnitude, the overvoltage protection circuit 21 becomes conductive and short circuits the output so as to protect the load equipment and the regulator.

DESCRIPTION OF THE PREFERRED EMBODIMENT — DETAILED

Figure 2B:
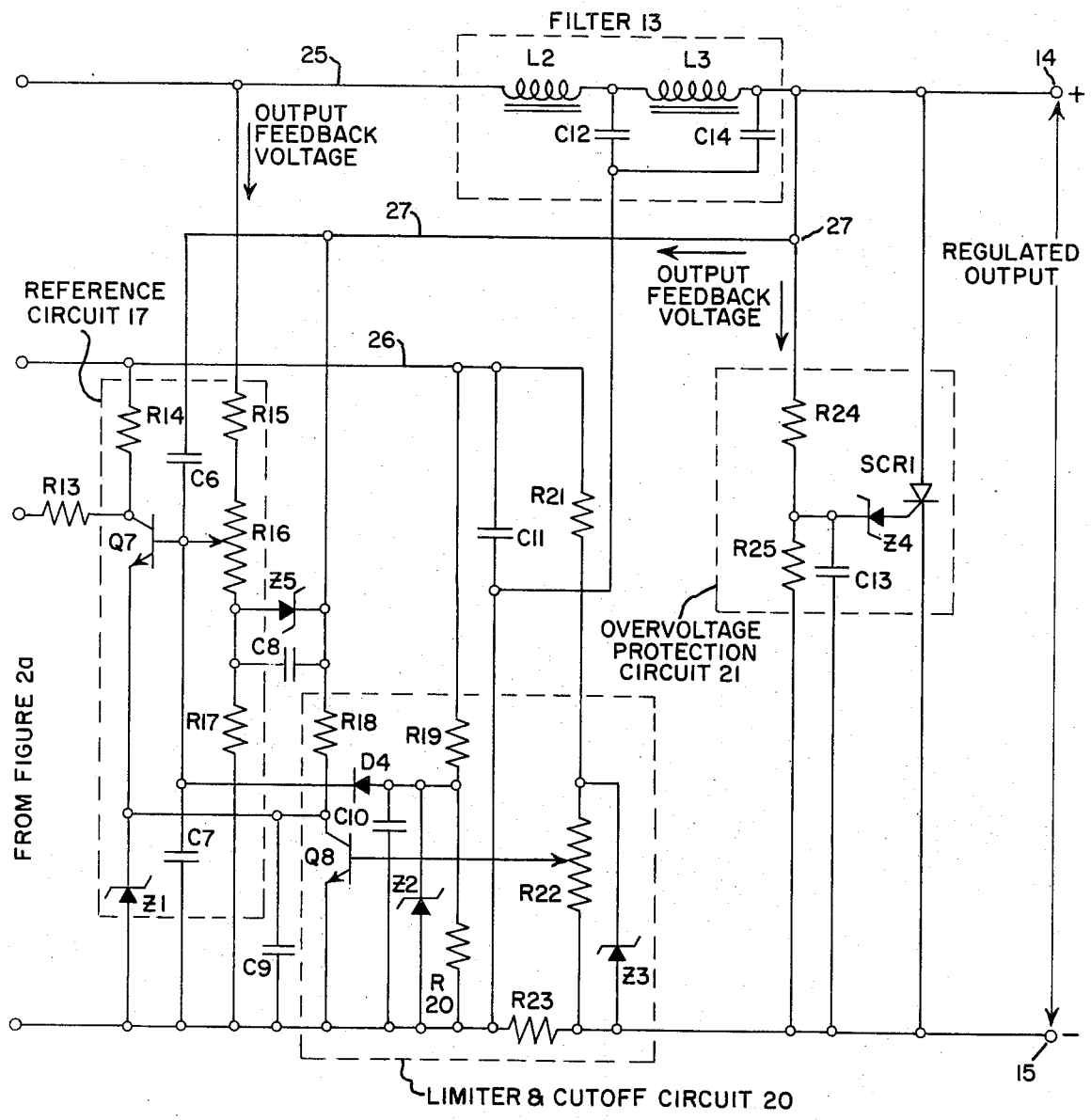

FIGS. 2a and 2b show a complete electrical diagram of the regulator of FIG. 1. FIGS. 2a and 2b are to be considered together, with the lines at the right of FIG. 2a being connected to the lines at the left of FIG. 2b. In FIGS. 2a and 2b, the input and output terminals are designated with the same reference numerals as in FIG. 1, and dashed line rectangles are designated with the same legends and reference numerals as the blocks of FIG. 1. Thus, the various parts of FIGS. 2a and 2b are correspondingly shown and designated, but in more detail.

The input terminal 10 is connected through an inductor L1 to the emitter of a PNP type transistor Q1 in the series regulator circuit 12. The base of the transistor Q1 is connected to the collector of an NPN type transistor Q2 in the control circuit 18. The collector of the transistor Q1 is connected through a bus 25 to an inductor L2 in the filter 13. The inductor L2 is connected through an inductor L3 to the output terminal 14. Also in the filter 13, I provide capacitors C12, C14 which are connected to a lower bus and to the input terminal 11. During the time that the transistor Q1 is being turned off, current continues to flow from the source to the load. When the voltage drop across the transistor Q1 reaches the forward drop across a diode D1, the diode D1 conducts and bypasses the transistor Q1 for the remainder of the time the transistor Q1 is being turned off. This bypass current can flow through the circuit comprising the diode rectifier D1, a resistor R2, and a capacitor C2 connected around the transistor Q1. The resistor R2 provides a discharge path for the capacitor C2. Thus, the transistor Q1 is protected from simultaneous high current and high voltage during the time it is being turned off. The output of the filter 13 is connected to a bus 27 and to the output terminal 14. The switch S1 is connected through a diode rectifier D2 and a resistor R3 to a bus 26 which supplies operating power to the trigger circuit 16, the reference circuit 17, and the limiter and cutoff circuit 20. In the control circuit 18, input signals from the trigger circuit 16 are connected to a first NPN type transistor Q3 which is connected to a second NPN type transistor Q2. The collector of the transistor Q2 supplies conducting signals to the base of the transistor Q1 so as to determine when the transistor Q1 conducts. In the trigger circuit 16, two PNP type transistors Q5, Q6 are connected in a Schmitt trigger configuration so as to provide a sharp reference circuit signal at its output, which is taken from the collector of the transistor Q5. Input reference circuit signals for the trigger circuit 16 are applied to the base of the transistor Q6 which is connected through a resistor R13 to the output of the reference circuit 17. The reference circuit output signals are produced at the collector of an NPN type transistor Q7. The collector of the transistor Q7 is connected to the bus 26, and the emitter of the transistor Q7 is connected through a reference zener diode Z1 to the negative terminal 11. A voltage divider comprising resistors R15, R16, R17 is connected between the bus 25 (at the output of the series regulator circuit 12) and the negative terminal 11. This voltage divider supplies a selected voltage to the base of the transistor Q7 so as to set, with respect to the voltage reference supplied by the zener diode Z1, the magnitude at which the transistor Q7 conducts with respect to voltage supplied by the series regulator circuit 12.

Just as explained in connection with FIG. 1, the portions of FIGS. 2a and 2b which have been described thus far are known in the art. Before describing the additional features of my invention, I will explain the operation of this known part of the circuit.

In FIGS. 2a and 2b, the source of direct current is assumed to be connected to the input terminals 10, 11 at all times. However, no power appears at the output terminals 14, 15 until the switch S1 is closed. When the switch S1 is closed, a voltage appears across the resistors R5, R6. These resistors R5, R6 are proportioned so that this voltage causes the transistor Q4 in the lockout circuit 19 to be turned off. The off condition of the transistor Q4 permits the transistors Q3, Q2 in the control circuit 18 to conduct when a reference circuit signal is applied to the base of the transistor Q3. Closing of the switch S1 also applies a voltage through the diode D2 and the resistor R3 to the bus 26. At the instant the switch S1 is closed, the transistor Q7 in the reference circuit 17 is turned off, since the transistor Q1 in the regulator circuit 12 has not started to conduct. With the transistor Q7 turned off, a positive voltage is applied through the resistors R14, R13 to the base of the transistor Q6 in the trigger circuit 16. This causes the transistor Q6 to be turned off, so that the transistor Q5 is turned on. This applies a positive-going or sharp reference circuit signal to the base of the transistor Q3, causing both transistors Q3, Q2 to turn on. With the transistors Q3, Q2 turned on, a conducting signal or base current is applied to the transistor Q1 in the regulator circuit 12 so that the transistor Q1 turns on and is driven into saturation. Conduction of the transistor Q1 permits current to flow through the filter 13 to the load connected to the output terminals 14, 15. At this time, a voltage is supplied across the voltage divider R15, R16, R17 in the reference circuit 17. Current begins to flow through the capacitor C7, and charge this capacitor C7. When the capacitor C7 charges to the voltage level set by the zener diode Z1 plus the base to emitter voltage of the transistor Q7, the transistor Q7 will be turned on. When the transistor Q7 conducts, its collector voltage decreases, and this causes the transistor Q6 to be turned on. The collector voltage of the transistor Q6 increases so as to turn the transistor Q5 off. This removes the reference circuit signal and turns the transistors Q3, Q2 off. When the transistors Q3, Q2 turn off, the transistor Q1 is also turned off. Up to this time, after the switch S1 has been closed, the transistor Q1 has been turned on to supply energy to the filter 13 and current to the load, and has then been turned off.

When the transistor Q1 is turned off, the filter elements L2, L3, C12, C14 continue to supply current to the load over the path from the output terminal 14, through the load, the output terminal 15, and back through the diode D3. During this time when energy is supplied by the filter 13, the voltage across the voltage divider R15, R16, R17 in the reference circuit 17 is approximately 1 volt, this being the voltage drop across the diode D3. Thus, the voltage across the capacitor C7 of the reference circuit 17 begins to discharge. When the capacitor C7 has discharged sufficiently (determined by the breakdown voltage of the zener diode Z1 and the base-emitter voltage of the transistor Q7), the transistor Q7 is turned off again. This is the initial condition which was present when the switch S1 was first closed. This causes the transistor Q5 in the trigger circuit 16 to be turned on to supply a reference circuit signal. This signal turns the transistors Q3, Q2 in the control circuit 18 on again to provide base current to the regulator circuit transistor Q1. The transistor Q1 turns on and provides current from the source to the filter 13 and load again. Thus, the switching cycle is initiated again.

The time for one complete switching cycle (that is the time during which the transistor Q1 is first turned on and is turned off, until it is turned on again) is determined, in part, by the value of the capacitor C7 and its charge and discharge path provided by the resistors R15, R16, R17, and the breakdown voltage of the zener diode Z1. The total time is also dependent on the ratio of the input voltage across the terminals 10, 11 and the output voltage across the terminals 14, 15, as well as the circuit relations between the transistor Q7 in the reference circuit 17 and the transistors Q6, Q5 in the trigger circuit 16. In one switching cycle, the ratio of the time the transistor Q1 is turned on to the time the transistor Q1 is turned off varies inversely with the ratio of the input and output voltages, and directly with the amount of current supplied to the load. Thus, the transistor Q1 conducts for a smaller proportion of time as the input to output voltage ratio increases or as the load current decreases; and conducts for a larger proportion of time as the ratio of input to output voltages decreases or as the load current increases.

The circuit and its operation as explained thus far are known in the art. While the circuit and operation are satisfactory for many purposes, I have found that certain installations, particularly those where the source voltage may vary over a wide range, require functions not provided by the circuit as described. To attain these functions, I have provided the lockout circuit 19, the current limiter and cutoff circuit 20, and the overvoltage protection circuit 21. In the circuit as described previously, when the switch S1 is opened, the control circuit 18 removes the conducting signal from the transistor Q1 and turns this transistor Q1 off. Thus, it is not necessary that the switch S1 handle a large amount of current when it is opened. This protects the switch S1 and avoids large currents in the leads (which may be long) to the switch S1. In some situations, such as under the right temperature conditions, leakage currents might cause the transistors Q3, Q2 in the control circuit 18 to conduct and turn the transistor Q1 on again even though the switch S1 is open. This possibility is avoided by my lockout circuit 19. When the switch S1 is opened, a PNP type transistor Q4 is forward biased, and effectively clamps the base of the transistor Q3 to the negative terminal 11. Hence, the transistors Q3, Q2 cannot conduct and accidentally turn on the transistor Q1. In addition to possible temperature leakage currents, the capacitor C11 connected to the bus 26 requires a finite time to discharge after the switch S1 is opened. During the time the capacitor C11 has the charge, it could provide a reference circuit signal which keeps the transistors Q3, Q2 turned on, thus causing the transistor Q1 to continue to conduct. The result would be a transient voltage at the output terminals 14, 15 which is approximately equal to the input voltage at the terminals 10, 11. Improper operation of the lockout circuit 19 is eliminated by an isolating diode D2 between the transistor Q4 and the capacitor C11. Thus, when the switch S1 is opened, my circuit insures that the transistor Q4 is forward biased so that it clamps the base of the transistor Q3 in a turn-off condition.

Also because of the widely fluctuating or variable input voltages, it is desirable and in some cases essential, that means be provided to control the current and limit it to a specified magnitude. And, of course, this control is desirable without having to dissipate appreciable amounts of direct current in the components. These features are provided by my current limiter and cutoff circuit 20. As mentioned earlier, the zener diode Z1 serves as a reference voltage for the reference circuit 17. If the reference voltage is lowered, the transistor Q7 can conduct more readily. During the time the transistor Q7 conducts, the transistor Q1 in the regulator circuit 12 is turned off. Thus, if the reference voltage is reduced, the transistor Q1 is turned off for a greater proportion of a switching cycle, so that the output current and hence power will be reduced. An NPN type transistor Q8 in the limiter circuit 20 is connected in parallel with the zener diode Z1, and its bias is set by two resistors R21, R22, connected between the bus 26 and the negative input terminal 11, and is also set by a resistor R23 which is connected in series between the output terminal 15 and the input terminal 11. A zener diode Z3 is connected across the resistor R22 to prevent any input voltage fluctuations from affecting the bias on the transistor Q8 when the output current is steady. The bias on the transistor Q8 may be adjusted by the resistor R22 so that the transistor Q8 is turned on at a selected current flow through the resistor R23, which tends to forward bias the transistor Q8. When the current flow through the resistor R23 reaches this turn-on magnitude, the transistor Q8 is turned on. This lowers the reference voltage at the emitter of the transistor Q7 in the reference circuit 17. This tends to cause the transistor Q7 to conduct more readily, and decreases the amount of time that the transistor Q1 in the series regulator circuit 12 conducts. As the output current through the resistor R23 increases, the reference voltage is lowered, and the transistor Q1 conducts for a still smaller proportion of time. Thus, a current limiting effect is provided by the setting of the resistor R22 in the limiter portion of the circuit 20. This limiting of the current will, of course, cause the output voltage to decrease. A typical load requires some minimum amount of voltage for proper operation, so that it is undesirable for the output voltage to fall below some selected magnitude. In fact, when some electronic equipment has an input voltage that is so low, it is more desirable for the equipment to be turned off.

This turning off is provided by the cutoff portion of the circuit 20 which comprises a diode D4 and voltage divider resistors R19, R20. As the amount of time that the transistor Q1 conducts becomes very short or small, the output voltage applied to the base of the transistor Q7 becomes so small that the transistor Q7 does not operate properly, and becomes unstable. When this point is reached, current begins to flow from the bus 26 through the resistor R19, the diode D4, and the base-emitter path of the transistor Q7 to turn the transistor Q7 on permanently. With the transistor Q7 on, the transistor Q1 is turned off, so that no further output voltage is produced at the terminals 14, 15. The circuit will then remain in this condition until the overload condition is removed, and the switch S1 opened and then closed. The zener diode Z2 is provided to prevent the voltage at the junction of the resistors R19, R20 from turning Q7 on permanently because of high input voltages. The voltage applied to the diode D4 should be delayed for a sufficient length of time to allow the unit to be turned on in a normal manner, and this is achieved with the capacitor C10.

Under some conditions, an extremely high voltage may be present at the output terminasl 14, 15. Such a high voltage might occur if the transistor Q1 in the regulator circuit 12 should become short circuited, or if some voltage transient passes through the diode D1 and the capacitor C2. To prevent this from damaging the load equipment, I provide the overvoltage protection circuit 21. This protection circuit includes a silicon controlled rectifier SCR1 having its anode and cathode connected across the output terminals 14, 15, and having its gate electrode connected to voltage divider resistors R24, R25, also across the output terminals 14, 15. If a high voltage is present at the output terminals 14, 15, the rectifier SCR1 is turned on to provide a short circuit at the output terminals 14, 15. If the voltage regulator is in the proper working order, this short circuit will appear as a current overload and cause the current limiter circuit 20 to turn the regulator off. If the series regulator circuit 12 becomes short-circuited or permanently turned on by a malfunction, an input fuse (not shown) will blow. A capacitor C13 is provided in this circuit to prevent the rectifier SCR1 from firing in response to a short, high voltage transient.

It will thus be seen that I have provided improved features, namely a lockout circuit, a current limiter and cutoff circuit, and an overvoltage protection circuit, to the previously known voltage regulator. These additional features of my invention provide improved operation of the voltage regulator, and permit such a regulator to be used with a widely variable or unstable direct current source voltage, and still provide adequate and protected operation for a load. While I have shown only one embodiment of my invention, persons skilled in the art will appreciate the variations which can be made to my circuits and still obtain the same improved and reliable operation. Therefore, while my invention has been described with reference to this particular embodiment, it is to be understood that modifications may be made without departing from the spirit of the invention or from the scope of the claims.

What I claim as new and desire to secure by letters patent of the United States is:

1. In a voltage regulator having input terminals for receiving a source of variable direct current voltage, a series regulator circuit connected to said input terminals, a filter connected to the output of said series regulator circuit, output terminals connected to the output of said filter, a voltage reference circuit connected to said output of said series regulator circuit for producing a reference circuit signal in response to a voltage at said regulator circuit output that is below a selected magnitude with respect to the reference voltage provided by said voltage reference circuit, a control circuit having an input connected to said voltage reference circuit and an output for producing a conducting signal in response to said reference circuit signal, and means connecting said control circuit output to said series regulator to supply said conducting signal thereto and control the current supplied to said filter and said output terminals as a function of said reference circuit signal, and thereby provide relatively stable direct current voltage to said output terminals, the improvement comprising:

a. a lockout circuit connectd to the input of said control circuit, said lockout circuit having an input terminal for connection to the source of variable direct current voltage and having means for preventing reference circuit signals from being applied to the control circuit input in response to the absence of said direct current voltage at said lockout circuit input terminal;

b. a current limiter circuit having means connected to the voltage regulator for sensing the magnitude of current supplied to said voltage regulator output terminals and having means connected between said sensing means and the voltage reference circuit for changing the reference voltage as an inverse function of said current magnitude supplied to said output terminals;

c. and a current cutoff circuit connected to said voltage reference circuit for preventing said voltage reference circuit from producing said reference circuit signals in response to the regulator output voltage falling below a selected low magnitude.

2. The improvement defined in claim 1, and further comprising a short-circuiting device connected across said current regulator output terminals for short-circuiting said output terminals in response to a voltage that exceeds a selected magnitude.

3. The improvement defined in claim 1 wherein said current limiter sensing means comprises a resistor.

* * * * *

UNITED STATES PATENT OFFICE
CERTIFICATE OF CORRECTION

Patent No. 3,809,999　　　　　　　　Dated　May 7, 1974

Inventor(s)　Cantrell Smith

It is certified that error appears in the above-identified patent and that said Letters Patent are hereby corrected as shown below:

Line 2 of Abstract　　　cancel "transitor" and insert -- transistor --

Column 2, line 24　　　cancel "shoft" and insert -- short --

Claim 1.a., line 55　　cancel "connectd" and insert -- connected --

Signed and sealed this 22nd day of October 1974.

(SEAL)
Attest:

McCOY M. GIBSON JR.　　　　　　　　C. MARSHALL DANN
Attesting Officer　　　　　　　　　Commissioner of Patents